(12) United States Patent
Gou et al.

(10) Patent No.: US 10,475,413 B2
(45) Date of Patent: Nov. 12, 2019

(54) METHOD AND APPARATUS FOR ADJUSTING BACKLIGHT BRIGHTNESS OF SCREEN, AND MOBILE TERMINAL

(71) Applicant: GUANGDONG OPPO MOBILE TELECOMMUNICATIONS CORP., LTD., Dongguan (CN)

(72) Inventors: Shengjun Gou, Dongguan (CN); Yongpeng Yi, Dongguan (CN); Xiaori Yuan, Dongguan (CN); Zhiyong Zheng, Dongguan (CN); Gaoting Gan, Dongguan (CN); Hai Yang, Dongguan (CN); Deliang Peng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 143 days.

(21) Appl. No.: 15/798,634

(22) Filed: Oct. 31, 2017

(65) Prior Publication Data

US 2018/0261183 A1 Sep. 13, 2018

(30) Foreign Application Priority Data

Mar. 10, 2017 (CN) .......................... 2017 1 0142875

(51) Int. Cl.
*G09G 5/00* (2006.01)
*G06F 3/0487* (2013.01)

(52) U.S. Cl.
CPC .......... *G09G 5/003* (2013.01); *G06F 3/0487* (2013.01); *G09G 2320/0626* (2013.01); *G09G 2320/08* (2013.01)

(58) Field of Classification Search
CPC ................. G09G 5/003; G09G 3/3406; G09G 2320/0247; G09G 2320/08;
(Continued)

(56) References Cited

U.S. PATENT DOCUMENTS

2005/0184952 A1 8/2005 Konno et al.
2007/0171183 A1 7/2007 Yang et al.
(Continued)

FOREIGN PATENT DOCUMENTS

CN 101686402 A 3/2010
CN 102157140 A 8/2011
(Continued)

OTHER PUBLICATIONS

PCT/CN2017/109978 English translation of International Search Report and Written Opinion dated Feb. 5, 2018, 13 pages.
(Continued)

*Primary Examiner* — Mark W Regn
(74) *Attorney, Agent, or Firm* — Lathrop Gage LLP (57) ABSTRACT

A method and an apparatus for adjusting a backlight brightness of a screen, and a mobile terminal are provided. At least one of a display frame characteristic of the screen, a user behavior characteristic, a camera status and a scene characteristic of the screen is obtained when a backlight control function is enabled. A target backlight control level is determined according to the at least one of the display frame characteristic of the screen, the user behavior characteristic, the camera status and the scene characteristic of the screen. The backlight brightness of the screen is adjusted dynamically based on the target backlight control level.

9 Claims, 5 Drawing Sheets determining whether the scene type of the screen is a static picture scene or a dynamic picture scene according to a click frequency of a clicking behavior, when the clicking behavior is detected ⟶ 301 determining whether the scene type of the screen is a static picture scene or a dynamic picture scene according to a sliding time, a sliding distance or a sliding range of a sliding behavior, when the sliding behavior is detected ⟶ 302

(58) Field of Classification Search
CPC ....... G09G 2320/0626; G09G 2340/16; G09G 2360/16; G09G 2320/10; G09G 2320/062; G06F 3/0487
See application file for complete search history.

(56) References Cited

U.S. PATENT DOCUMENTS

| | | |
|---|---|---|
| 2012/0327303 A1 | 12/2012 | Sun et al. |
| 2013/0155119 A1 | 6/2013 | Dai et al. |
| 2013/0231163 A1* | 9/2013 | Uchikawa ............ G09G 3/3406 455/566 |
| 2014/0204131 A1 | 7/2014 | Chen et al. |
| 2016/0284315 A1 | 9/2016 | Zhang |

FOREIGN PATENT DOCUMENTS

| | | |
|---|---|---|
| CN | 102542980 A | 7/2012 |
| CN | 102568396 A | 7/2012 |
| CN | 103050108 A | 4/2013 |
| CN | 103384314 A | 11/2013 |
| CN | 105100411 A | 11/2015 |
| CN | 105511765 A | 4/2016 |
| CN | 105741786 A | 7/2016 |
| CN | 106782431 A | 5/2017 |
| EP | 1107221 A2 | 6/2001 |
| EP | 2131350 A1 | 12/2009 |
| EP | 2521119 A2 | 11/2012 |
| JP | 2005049631 A | 2/2005 |
| KR | 20100077819 A | 7/2010 |

OTHER PUBLICATIONS

European Patent Application No. 17201312.0 Search and Opinion dated Jun. 5 2018, 18 pages.
Chinese Patent Application No. 201710142875.9 Office Action dated Jul. 23, 2018, 12 pages.
Chinese Patent Application No. 201710142875.9 English translation of Office Action dated Jul. 23, 2018, 18 pages.
European Patent Application No. 17201312.0 extended Search and Opinion dated Nov. 13, 2018, 20 pages.
Chinese Patent Application No. 201710142875.9 English translation of Office Action dated Feb. 28, 2019, 19 pages.
Chinese Patent Application No. 201710142875.9 Office Action dated Feb. 28, 2019, 13 pages.

* cited by examiner

Fig. 1

Fig. 2 determining whether the scene type of the screen is a static picture scene or a dynamic picture scene according to a click frequency of a clicking behavior, when the clicking behavior is detected ⸺301 determining whether the scene type of the screen is a static picture scene or a dynamic picture scene according to a sliding time, a sliding distance or a sliding range of a sliding behavior, when the sliding behavior is detected ⸺302

Fig. 3 determining a first preset backlight control level as the target backlight control level, when the scene type is a static picture scene ⸺401 determining a second preset backlight control level as the target backlight control level, when the scene type is an image preview scene ⸺402 determining a third preset backlight control level as the target backlight control level, when the scene type is a dynamic picture scene ⸺403

METHOD AND APPARATUS FOR ADJUSTING BACKLIGHT BRIGHTNESS OF SCREEN, AND MOBILE TERMINAL

CROSS-REFERENCE TO RELATED APPLICATIONS

This application is based on and claims priority of Chinese Patent Application No. 201710142875.9 filed on Mar. 10, 2017, the entire contents of which are incorporated herein by reference.

FIELD

The present disclosure relates to the electronic device field, and more particularly to a method for adjusting a backlight brightness of a screen, an apparatus for adjusting a backlight brightness of a screen and a mobile terminal.

BACKGROUND

With rapid development of the mobile communication technology and the computer technology, a mobile terminal such as a smart phone or a tablet computer has become an essential communication tool in people's life. How to take a requirement on both low power consumption and quality of an image displayed on a screen into account is an urgent problem to be solved in the image processing field. A backlight control technology, such as a content adaptive brightness control (for short, CABC) is configured to adjust a relationship between a gray-scale value of the image and a backlight brightness of the screen according to a content displayed on the screen, such that the image quality can be ensured while the backlight brightness of the screen is effectively reduced. However, at present, there are still some problems (such as flickering or shaking) in the image quality when the backlight brightness of the screen is adjusted based on the conventional backlight control technology.

DISCLOSURE

The present disclosure provides a method for adjusting a backlight brightness of a screen, an apparatus for adjusting a backlight brightness of a screen and a mobile terminal, which can improve quality of an image displayed on a screen.

Embodiments of the present disclosure provide a method for adjusting a backlight brightness of a screen. The method includes: obtaining at least one of a display frame characteristic of the screen, a user behavior characteristic, a camera status and a scene characteristic, when a backlight control function is enabled; determining a target backlight control level according to the at least one of the display frame characteristic of the screen, the user behavior characteristic, the camera status and the scene characteristic; and adjusting the backlight brightness of the screen dynamically based on the target backlight control level.

Embodiments of the present disclosure further provide an apparatus for adjusting a backlight brightness of a screen. The apparatus includes a non-transitory computer-readable medium comprising computer-readable instructions stored thereon, and an instruction execution system configured by the instructions to implement at least one of an obtaining module, a determining module, and a control module. The obtaining module is configured to obtain at least one of a display frame characteristic of the screen, a user behavior characteristic, a camera status and a scene characteristic, when a backlight control function is enabled. The determining module is configured to determine a target backlight control level according to the at least one of the display frame characteristic of the screen, the user behavior characteristic, the camera status and the scene characteristic. The control module is configured to adjust the backlight brightness of the screen dynamically based on the target backlight control level.

Embodiments of the present disclosure provide a mobile terminal. The mobile terminal includes a screen, a memory, a processor, and a computer program stored in the storage and executable by the processor. The processor is configured to perform a method for adjusting a backlight brightness of the screen according to embodiments of the present disclosure by executing the computer program.

With embodiments of the present disclosure, when the backlight control function is enabled, at least one of the display frame characteristic of the screen, the user behavior characteristic, the camera status and the scene characteristic is obtained, the target backlight control level is determined according to at least one of the above mentioned characteristics, and the backlight brightness of the screen can be adjusted using the target backlight control level. In this way, the accuracy of determining the target backlight control level can be improved, thus improving the quality of the image displayed on the screen.

EMBODIMENTS OF THE PRESENT DISCLOSURE

Reference will now be made in detail to exemplary embodiments, examples of which are illustrated in the accompanying drawings. It should be understood that, embodiments described below are merely exemplary and used for explaining the present disclosure, and should not be understood as limitation to the present disclosure. Further, for ease of description, only related components rather than all the components are illustrated in the accompanying drawings.

Before illustrating exemplary embodiments in detail, it should be noted that, some exemplary embodiments are described as processes or methods in a form of flow chart. Although respective operations are described as successive processing in the flow chart, some of them can be implemented in parallel, concurrently or simultaneously. Moreover, the order of respective operations can be rearranged. When the operations are completed, the processing can be terminated. However, there may be additional operations which are not included in the drawings. The processing can be corresponding to method, function, procedure, subroutine, subprogram, or the like.

Figure 1:
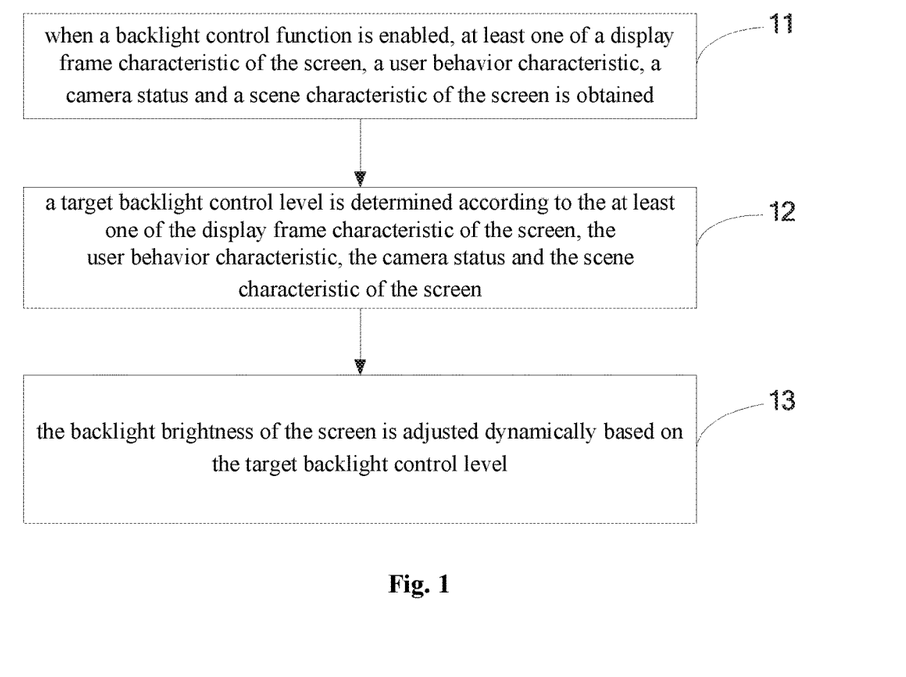
FIG. 1 is a flow chart of a method for adjusting a backlight brightness of a screen according to an embodiment of the present disclosure.

FIG. 1 is a flow chart of a method for adjusting a backlight brightness of a screen according to an embodiment of the present disclosure. The method can be performed by an apparatus for adjusting a backlight brightness of a screen. The apparatus can be implemented by software or hardware or a combination thereof, and can be applied in a mobile terminal. As illustrated in FIG. 1, the method includes the following.

At block 11, when a backlight control function is enabled, at least one of a display frame characteristic of the screen, a user behavior characteristic, a camera status and a scene characteristic of the screen is obtained.

The characteristic of the display frame of the screen can include at least one of a gray-scale, a brightness, a transparency, a hue, a contrast ratio, a saturability and an ambiguity of the display frame. The user behavior characteristic can include a user behavior type and a time, a distance or a range corresponding to the user behavior. The camera status can include an enabled status and a disabled status. The scene characteristic of the screen may be used to determine or indicate a scene type of the screen.

The sensitivity of the user to an adjustment of the gray scale of the image on the screen varies with different characteristic changes between adjacent display frames, different user behavior characteristics or different camera statuses, such that different backlight control ways can be determined for the screen based on the characteristic change between adjacent display frames, the user behavior characteristic or the camera status.

Moreover, the scene characteristic of the screen can include a frame rate of the screen, a type of an active process running in the screen or a type of a current layer or the like. For example, if the current frame rate of the screen is 0, the current scene type of the screen is a static picture scene. If the active process running currently is a video-type process or a game-type process, and the current layer is a dynamic layer, the current scene type of the screen is a dynamic picture scene.

At block 12, a target backlight control level is determined according to the at least one of the display frame characteristic of the screen, the user behavior characteristic, the camera status and the scene characteristic of the screen.

A multi-level backlight control function refers to that, the gray scale value of the image and the backlight brightness of the screen are adjusted to different extents, such that the backlight control function consumes decreased power of the terminal and endurance of the terminal is obviously improved. However, if the backlight control level does not match with the scene of the screen, it may cause problems in the image quality, such as flickering or shaking.

In detail, the target backlight control level is determined according to at least one of the above mentioned characteristics and a preset level determining rule in the terminal. In this way, the matching between the backlight control level and the scene of the screen can be ensured, such that it can avoid problems in the image quality on the screen during the controlling according to the target backlight brightness control level.

At block 13, the backlight brightness of the screen is adjusted dynamically based on the target backlight control level.

Multiple backlight control levels and control parameters corresponding to the respective backlight control levels, for example, an enhanced range of a gray scale and a duty ratio of a pulse width modulation (PWM for short) signal sent to a backlight drive chip corresponding to each backlight control level, can be preset in the terminal. The higher the backlight control level is, the smaller the duty ratio is (i.e., the smaller the backlight brightness is), and the bigger the enhanced range of the gray scale is.

In detail, the control parameters corresponding to the target backlight control level are obtained from the terminal, and are used for adjusting the gray scale of the image and the backlight brightness of the screen simultaneously.

With embodiments of the present disclosure, when the backlight control function is enabled, at least one of the display frame characteristic of the screen, the user behavior characteristic, the camera status and the scene characteristic is obtained, the target backlight control level is determined according to the at least one of the above mentioned characteristics, and the gray scale and the backlight brightness of the screen can be adjusted using the target backlight control level. In this way, the accuracy of determining the target backlight control level can be improved, thus improving the quality of the image displayed on the screen.

In some embodiments, the target backlight control level can be determined according to the at least one of the display frame characteristic of the screen, the user behavior characteristic, the camera status and the scene characteristic of the screen as follows.

In an embodiment of the present disclosure, a scene type of the screen is determined according to the at least one of the display frame characteristic of the screen, the user behavior characteristic, the camera status and the scene characteristic of the screen. Then, the target backlight control level corresponding to the scene type is determined according to a preset mapping relationship between scene types and backlight control levels.

For example, when the camera status indicates an enabled status, the scene type of the screen is determined as an image preview scene. When the camera status indicates a disabled status, it is determined whether a characteristic change between adjacent display frames (i.e., a change in characteristics of adjacent display frames) is greater than a characteristic threshold, if yes, the scene type of the screen is determined as a dynamic picture scene, otherwise, the scene type the screen is determined as a static picture scene.

It should be noted that, it is possible to directly determine whether the characteristic change between adjacent display frames is greater than the characteristic threshold, if yes, the scene type of the screen is determined as the dynamic picture scene, otherwise, the scene type the screen is determined as the static picture scene.

Figure 3:
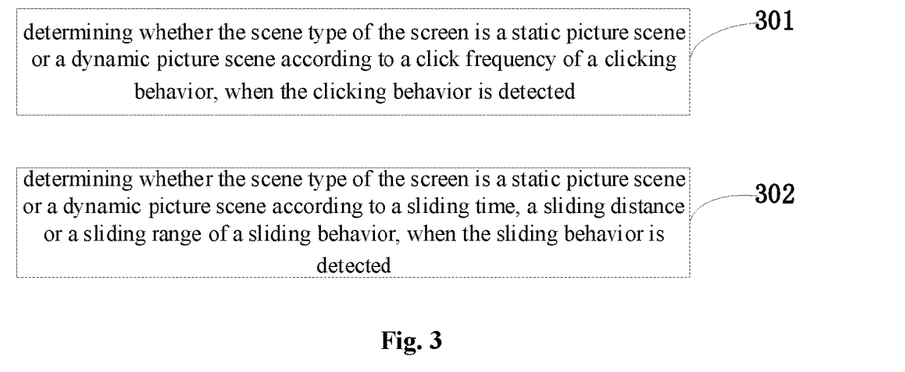
FIG. 3 is a block diagram of an apparatus for adjusting a backlight brightness of a screen according to an embodiment of the present disclosure.

In an embodiment, when a clicking behavior of the user is detected, it is determined whether the scene type of the screen is the static picture scene or the dynamic picture scene according to a click frequency of the clicking behavior. In another embodiment, when a sliding behavior is detected, it is determined whether the scene type of the screen is the static picture scene or the dynamic picture scene according to a sliding time, a sliding distance or a sliding range of the sliding behavior. This embodiment is illustrated in FIG. 3. At block 301, it is determined whether the scene type of the screen is a static picture scene or a dynamic picture scene according to a click frequency of a clicking behavior, when the clicking behavior is detected. At block 302, it is determined whether the scene type of the screen is a static picture scene or a dynamic picture scene according to a sliding time, a sliding distance or a sliding range of a sliding behavior, when the sliding behavior is detected.

In an embodiment, when the scene type is a static picture scene, a first preset backlight control level is determined as the target backlight control level.

When the scene type is an image preview scene, a second preset backlight control level is determined as the target backlight control level.

When the scene type is a dynamic picture scene, a third preset backlight control level is determined as the target backlight control level.

A backlight brightness corresponding to the first preset backlight control level is greater than that corresponding to the second preset backlight control level, and the backlight brightness corresponding to the second preset backlight control level is greater than that corresponding to the third preset backlight control level.

In detail, the faster the picture of the screen changes, the better the effect of the backlight control function is. In order to take the static picture into account, the effect of the backlight control function generally needs to be applicable to the static picture, which leads to a poor power-saving effect. However, according to embodiments of the present disclosure, by accurately identifying the scene type of the screen and performing the adjustment based on the backlight control level matching with the scene type, the power-saving effect can be improved under a premise of ensuring the image quality.

Figure 4:
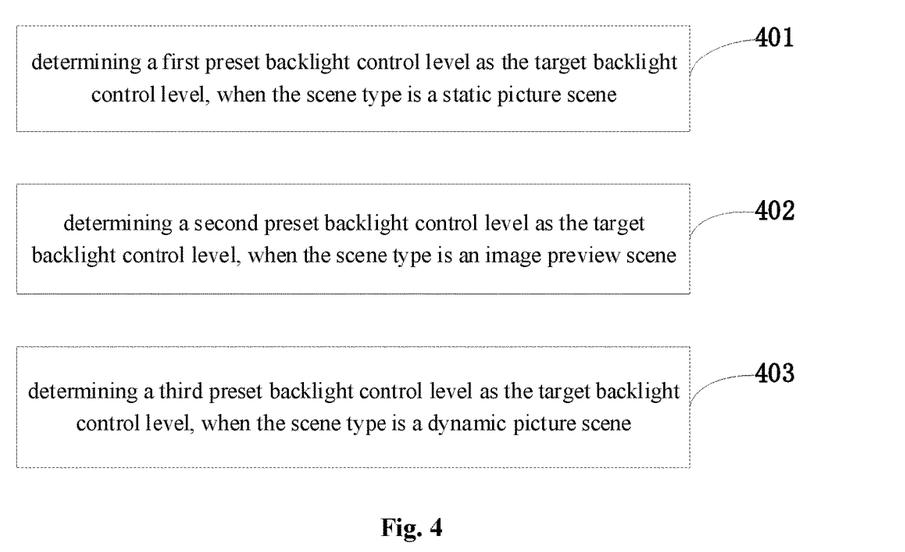
FIG. 4 is a block diagram of an apparatus for adjusting a backlight brightness of a screen according to an embodiment of the present disclosure.

This embodiment is illustrated in FIG. 4. At block 401, a first preset backlight control level is determined as the target backlight control level, when the scene type is a static picture scene. At block 402, a second preset backlight control level is determined as the target backlight control level, when the scene type is an image preview scene. At block 403, a third preset backlight control level is determined as the target backlight control level, when the scene type is a dynamic picture scene.

Figure 2:
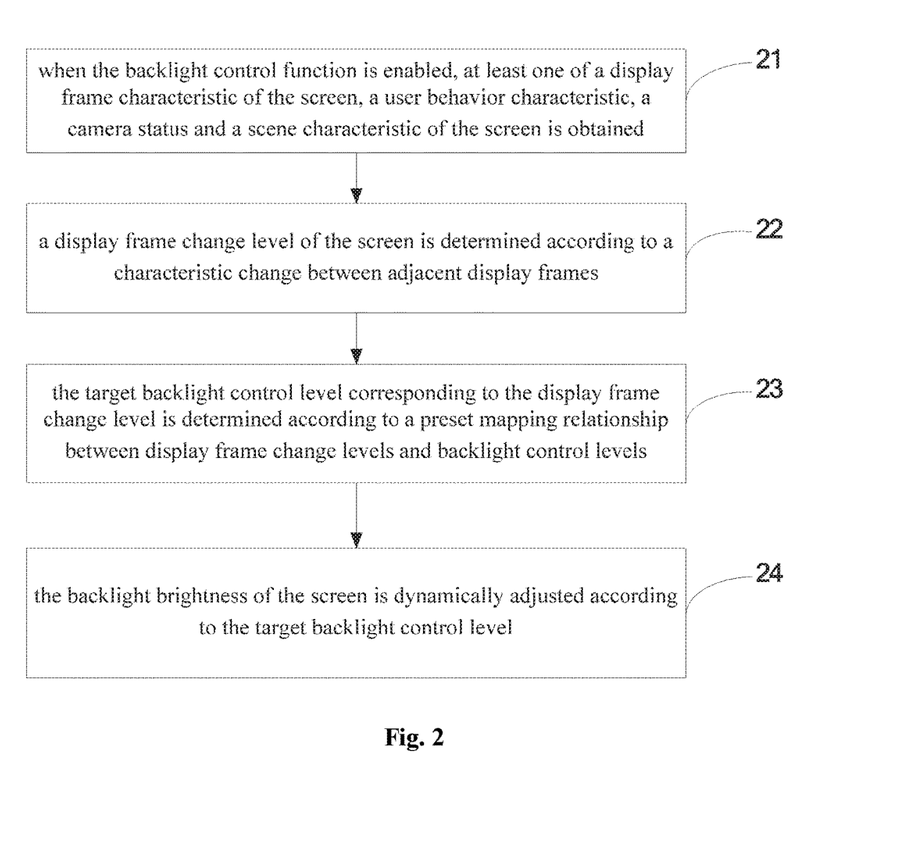
FIG. 2 is a flow chart of a method for adjusting a backlight brightness of a screen according to an embodiment of the present disclosure.

Based on the above mentioned embodiments, with reference to FIG. 2, the method for adjusting the backlight brightness of the screen may include the following.

At block 21, when the backlight control function is enabled, at least one of a display frame characteristic of the screen, a user behavior characteristic, a camera status and a scene characteristic of the screen is obtained.

At block 22, a display frame change level of the screen is determined according to a characteristic change between adjacent display frames.

There are multiple display frame change levels and a characteristic change range corresponding to each display frame change level preset in the terminal.

In detail, the characteristic change between adjacent display frames is determined according to the characteristics of display frames, and the range to which the characteristic change belongs is determined, and then the display frame change level is determined.

At block 23, the target backlight control level corresponding to the display frame change level is determined according to a preset mapping relationship between display frame change levels and backlight control levels.

The target backlight control level increases with an increasing of the display frame change level. In detail, the higher the display frame change level is, the faster the picture of the screen changes, and the higher the backlight brightness of the backlight control level is. In this way, not only the power-saving effect is improved, but also the image quality is not influenced.

At block 24, the backlight brightness of the screen is dynamically adjusted according to the target backlight control level.

Figure 5:
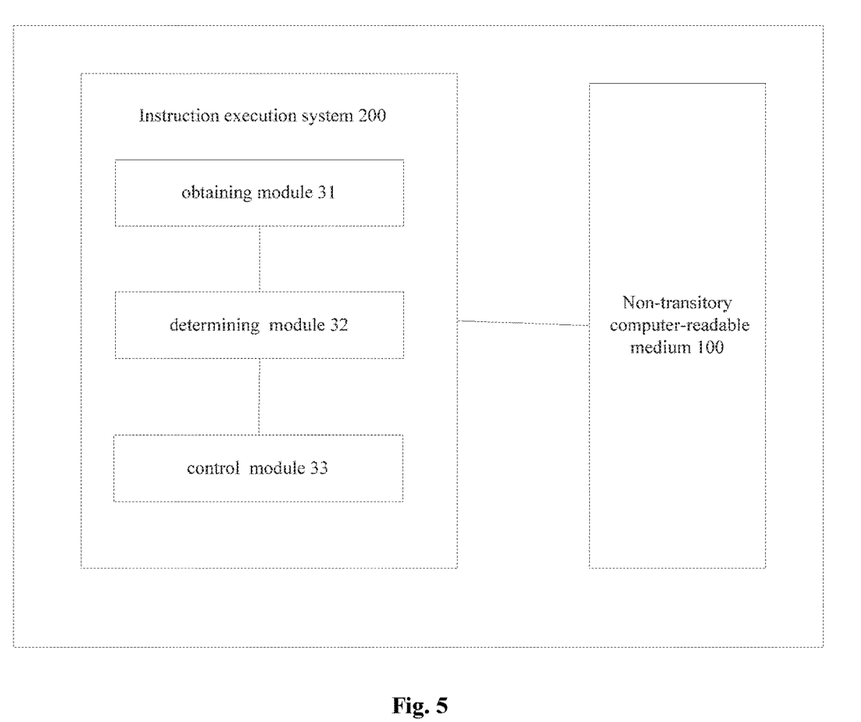
FIG. 5 is a block diagram of an apparatus for adjusting a backlight brightness of a screen according to an embodiment of the present disclosure.

FIG. 5 is a block diagram of an apparatus for adjusting a backlight brightness of a screen according to an embodiment of the present disclosure. The apparatus can be applied in a mobile terminal. As illustrated in FIG. 5, the apparatus includes a non-transitory computer-readable medium 100 including computer-executable instructions stored thereon and an instruction execution system 200 configured by the instructions to implement at least one of an obtaining module 31, a determining module 32 and a control module 33.

The obtaining module 31 is configured to obtain at least one of a display frame characteristic of the screen, a user behavior characteristic, a camera status and a scene characteristic of the screen, when a backlight control function is enabled.

The determining module 32 is configured to determine a target backlight control level according to the at least one of the display frame characteristic of the screen, the user behavior characteristic, the camera status and the scene characteristic of the screen.

The control module 33 is configured to adjust the backlight brightness of the screen dynamically based on the target backlight control level.

In an embodiment, the determining module 32 includes a first determining unit and a second determining unit.

The first determining unit is configured to determine a scene type of the screen according to the at least one of the display frame characteristic of the screen, the user behavior characteristic, the camera status and the scene characteristic of the screen.

The second determining unit is configured to determine the target backlight control level corresponding to the scene type according to a preset mapping relationship between scene types and backlight control levels.

In an embodiment, the first determining unit is configured to: determine the scene type of the screen as an image preview scene when the camera status indicates an enabled status; determine whether a characteristic change between adjacent display frames is greater than a characteristic threshold when the camera status indicates a disabled status; determine the scene type of the screen as a dynamic picture scene when the characteristic change is greater than the characteristic threshold; and determine the scene type of the screen as a static picture scene when the characteristic change is less than or equal to the characteristic threshold.

In an embodiment, the first determining unit is configured to: determine whether the scene type of the screen is a static picture scene or a dynamic picture scene according to a click frequency of a clicking behavior, when the clicking behavior is detected; or determine whether the scene type of the screen is a static picture scene or a dynamic picture scene according to a sliding time, a sliding distance or a sliding range of a sliding behavior, when the sliding behavior is detected.

In an embodiment, the second determining unit is configured to: determine a first preset backlight control level as the target backlight control level, when the scene type is a static picture scene; determine a second preset backlight control level as the target backlight control level, when the scene type is an image preview scene; and determine a third preset backlight control level as the target backlight control level, when the scene type is a dynamic picture scene. A backlight brightness corresponding to the first preset backlight control level is greater than that corresponding to the second preset backlight control level, and the backlight brightness corresponding to the second preset backlight control level is greater than that corresponding to the third preset backlight control level.

In an embodiment, the determining module 32 is configured to: determine a display frame change level of the screen according to a characteristic change between adjacent display frames; and determine the target backlight control level corresponding to the display frame change level according to a preset mapping relationship between change levels and backlight control levels. The target backlight control level increases with an increasing of the display frame change level.

The above apparatus for adjusting a backlight brightness of a screen belongs to a same inventive concept as the method for adjusting a backlight brightness of a screen according to any of embodiments of the present disclosure, and can perform the method for adjusting a backlight brightness of a screen according to any of embodiments of the present disclosure and have corresponding functional modules and advantageous effects corresponding to the method for adjusting a backlight brightness of a screen. Regarding details not described in the apparatus embodiments, reference can be made to the method for adjusting a backlight brightness of a screen according to any of embodiments of the present disclosure.

Embodiments of the present disclosure further provide a mobile terminal. The mobile terminal may include a screen, a memory, a processor and a computer program stored in the storage and executable by the processor. The processor is configured to perform the method for adjusting the backlight brightness of the screen according to embodiments of the present disclosure by executing the computer program.

Figure 6:
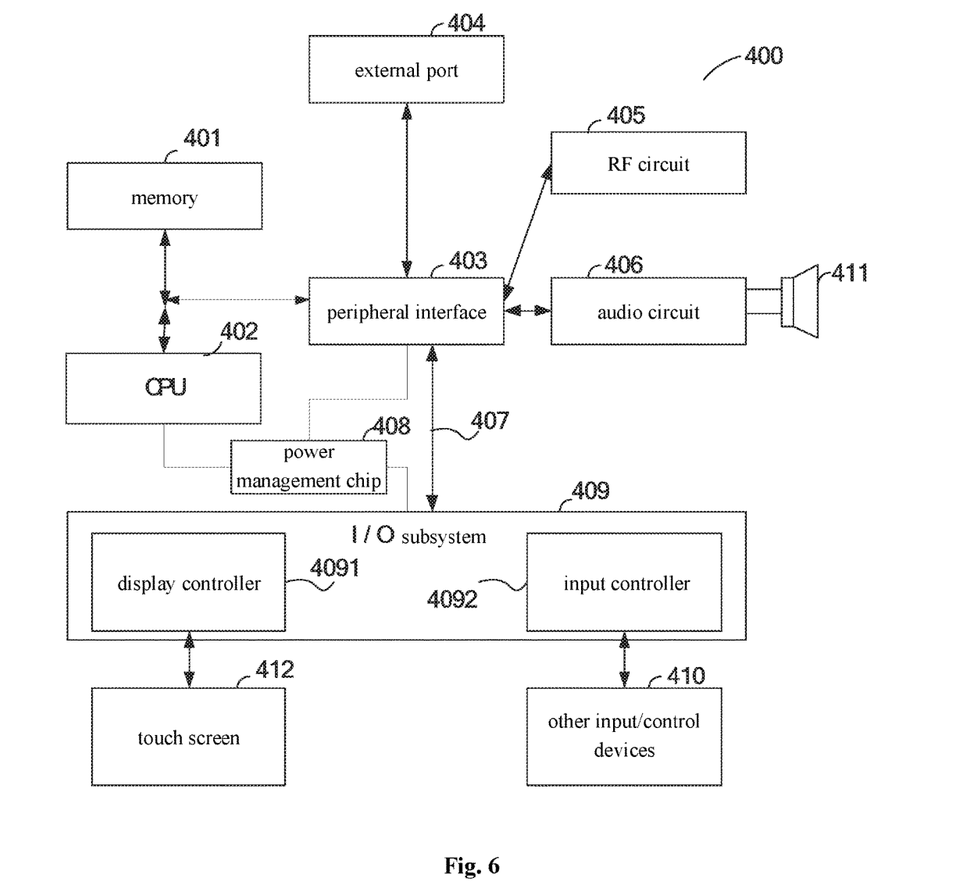
FIG. 6 is a block diagram of a mobile terminal according to an embodiment of the present disclosure.

FIG. 6 is a block diagram of a mobile terminal according to an embodiment of the present disclosure. As illustrated in FIG. 6, the smart phone 400 may include a memory 401, a central processing unit (CPU for short) 402, a peripheral interface 403, a RF circuit 405, an audio circuit 406, a speaker 411, a power management chip 408, an input/output (TO) subsystem 409, other input/control devices 410 and an external port 404. One of these components communicate with another of these components via one or more communication buses or signal lines 407.

It should be understood that, the smart phone 400 is just an example of the mobile terminal. The smart phone can have less or more than the components illustrated in FIG. 6, can combine two or more components, or can have different component arrangements. The components illustrated in FIG. 6 can be implemented in hardware, software or a combination of hardware and software including one or more signal processing circuits and/or application-specific integrated circuits.

In the following, the smart phone for adjusting a backlight brightness of a screen provided in embodiments of the present disclosure will be described in detail.

Memory 401: the memory 401 can be accessed by the CPU 402, the peripheral interface 403. The storage 401 can include a high speed semi random access memory, or can include a nonvolatile memory, for example one or more disk storage devices, flash storage devices, or other volatile storage devices.

Peripheral interface 403: the peripheral interface can connect the input and output peripheral devices to the CPU 402 and the storage 401.

I/O subsystem 409: the I/O subsystem 409 can connect the input and output peripheral device such as a touch screen 402 and other input/control devices 410 to the peripheral interface 403. The I/O subsystem 409 can include a display controller 4091 and one or more input controllers 4092 configured to control other input/control devices 410. The one or more input controllers 4092 receive electric signals from the other input/control devices 410 or send electric signals to the other input/control devices 410. The other input/control devices 410 may include a physical button (a press button, a rocker arm button or the like), a dial plate, a slide switch, a joystick or a click wheel. It should be noted that, the input controllers 4092 can be connected to any of a keyboard, an infrared port, a USB interface and an indicate device such as a mouse.

Touch screen 412: the touch screen 412 is an input interface and an output interface between the terminal and the user, which can display visible output for the user. The visible output may include a figure, a text, an icon or a video etc. . . . . .

The display controller 4091 in the I/O subsystem 409 receives an electric signal from the touch screen 412 or sends an electric signal to the touch screen 412. The touch screen 412 detects a contact thereon, the display control 4091 converts the detected contact into an interaction with a user interface object displayed on the touch screen 412, i.e., the man-machine interaction is realized. The user interface object displayed on the touch screen 412 can be an icon for running a game, an icon for accessing a corresponding network or the like. It should be noted that, the device may further include an optical mouse, which is a touch sensitive surface not displaying the visible output or an extend of a touch sensitive surface formed by the touch screen.

RF circuit 405: the RF circuit is mainly configured to establish a communication between the smart phone and a wireless network (on the network side), thus realizing a receipt and transmission of data between the smart phone and the wireless network, for example receiving or sending a message, an email or the like. In detail, RF circuit 405 receives and sends a RF signal, which is also called an electromagnetic signal. The RF circuit 405 converts an electric signal into an electromagnetic signal or converts an electromagnetic signal into an electric signal, and communicates with other devices via the electromagnetic signal and communication network. The RF circuit 405 can include a known circuit for realizing these functions, which includes but is not limited to an antenna system, a RF transceiver, one or more amplifiers, a tuner, one or more oscillators, a digital signal processor, a CODEC chip set, a subscriber identity module (SIM for short) or the like.

Audio circuit 406: the audio circuit is mainly configured to receive audio data from the peripheral interface 403, converts the audio data into an electric signal, and sends the electric signal to the speaker 411.

Speaker 411: the speaker is configured to restore the speech signal received from the wireless network via the RF circuit 405 into sound and playback the sound for the user.

Power management chip 408, the power management chip is configured to provide power and power management for hardware connected to the CPU 402, the I/O subsystem and the peripheral interface.

The CPU 402 according to this embodiment performs the following when executing the computer program: obtaining at least one of a characteristic of a display frame, a user behavior characteristic, a camera status and a scene characteristic, when a backlight control function is enabled; determining a target backlight control level according to the at least one of the characteristic of the display frame, the user behavior characteristic, the camera status and the scene characteristic; and adjusting the backlight brightness of the screen dynamically based on the target backlight control level.

Only preferred embodiments and technical principles of the present disclosure are described above. Those skilled in the art should understand that, the present disclosure is not limited the specific embodiments herein, and changes, alternatives, and modifications can be made in the embodiments without departing from spirit, principles and scope of the present disclosure. Therefore, although detailed description of the present disclosure is presented based on the above embodiments, the present disclosure is not limited to the above embodiments, and can include many other equivalent embodiments without departing from the inventive concept. The scope of the present disclosure is defined by the accompanying claims.

What is claimed is:

1. A method for adjusting a backlight brightness of a screen, comprising:
   obtaining at least one of a display frame characteristic of the screen, a user behavior characteristic, a camera status and a scene characteristic of the screen, when a backlight control function is enabled;
   determining a scene type of the screen according to the at least one of the display frame characteristic of the screen, the user behavior characteristic, the camera status and the scene characteristic of the screen, comprising: determining whether the scene type of the screen is a static picture scene or a dynamic picture scene according to a click frequency of a clicking behavior, when the clicking behavior is detected; or determining whether the scene type of the screen is a static picture scene or a dynamic picture scene according to a sliding time, a sliding distance or a sliding range of a sliding behavior, when the sliding behavior is detected;
   determining a target backlight control level corresponding to the scene type according to a preset mapping relationship between scene types and backlight control levels; and
   adjusting the backlight brightness of the screen dynamically based on the target backlight control level.

2. The method according to claim 1, wherein determining the target backlight control level corresponding to the scene type according to the preset mapping relationship between scene types and backlight control levels comprises:
   determining a first preset backlight control level as the target backlight control level, when the scene type is a static picture scene;
   determining a second preset backlight control level as the target backlight control level, when the scene type is an image preview scene; and
   determining a third preset backlight control level as the target backlight control level, when the scene type is a dynamic picture scene;
   wherein a backlight brightness corresponding to the first preset backlight control level is greater than that corresponding to the second preset backlight control level, and the backlight brightness corresponding to the second preset backlight control level is greater than that corresponding to the third preset backlight control level.

3. The method according to claim 1, wherein determining the target backlight control level according to the at least one of the display frame characteristic of the screen, the user behavior characteristic, the camera status and the scene characteristic of the screen comprises:
   determining a display frame change level according to a characteristic change between adjacent display frames; and
   determining the target backlight control level corresponding to the display frame change level according to a preset mapping relationship between display frame change levels and backlight control levels, wherein the target backlight control level increases with an increasing of the display frame change level.

4. An apparatus for adjusting a backlight brightness of a screen, comprising a non-transitory computer-readable medium comprising computer-executable instructions stored thereon, and an instruction execution system configured by the instructions to implement at least one of:
   an obtaining module, configured to obtain at least one of a display frame characteristic of the screen, a user behavior characteristic, a camera status and a scene characteristic the screen, when a backlight control function is enabled;
   a determining module, configured to determine a target backlight control level according to the at least one of the display frame characteristic of the screen, the user behavior characteristic, the camera status and the scene characteristic of the screen, wherein the determining module comprises: a first determining unit, configured to determine a scene type of the screen according to the at least one of the display frame characteristic of the screen, the user behavior characteristic, the camera status and the scene characteristic of the screen, and a second determining unit, configured to determine the target backlight control level corresponding to the scene type according to a preset mapping relationship between scene types and backlight control levels; wherein the first determining unit is configured to: determine whether the scene type of the screen is a static picture scene or a dynamic picture scene according to a click frequency of a clicking behavior, when the clicking behavior is detected; or determine whether the scene type of the screen is a static picture scene or a dynamic picture scene according to a sliding time, a sliding distance or a sliding range of a sliding behavior, when the sliding behavior is detected; and
   a control module, configured to adjust the backlight brightness of the screen dynamically based on the target backlight control level.

5. The apparatus according to claim 4, wherein the second determining unit is configured to:
   determine a first preset backlight control level as the target backlight control level, when the scene type is a static picture scene;
   determine a second preset backlight control level as the target backlight control level, when the scene type is an image preview scene; and
   determine a third preset backlight control level as the target backlight control level, when the scene type is a dynamic picture scene;
   wherein a backlight brightness corresponding to the first preset backlight control level is greater than that corresponding to the second preset backlight control level, and the backlight brightness corresponding to the second preset backlight control level is greater than that corresponding to the third preset backlight control level.

6. The apparatus according to claim 4, wherein the determining module is configured to:

determine a display frame change level according to a characteristic change between adjacent display frames; and determine the target backlight control level corresponding to the display frame change level according to a preset mapping relationship between display frame change levels and backlight control levels, wherein the target backlight control level increases with an increasing of the display frame change level.

7. A mobile terminal, comprising:

a screen;

a memory;

a processor; and a computer program stored in the memory and executable by the processor, wherein the processor is configured to perform following actions by executing the computer program:

obtaining at least one of a display frame characteristic of the screen, a user behavior characteristic, a camera status and a scene characteristic of the screen, when a backlight control function is enabled;

determining a scene type of the screen according to the at least one of the display frame characteristic of the screen, the user behavior characteristic, the camera status and the scene characteristic of the screen, comprising: determining whether the scene type of the screen is a static picture scene or a dynamic picture scene according to a click frequency of a clicking behavior, when the clicking behavior is detected; or determining whether the scene type of the screen is a static picture scene or a dynamic picture scene according to a sliding time, a sliding distance or a sliding range of a sliding behavior, when the sliding behavior is detected;

determining a target backlight control level corresponding to the scene type according to a preset mapping relationship between scene types and backlight control levels; and adjusting the backlight brightness of the screen dynamically based on the target backlight control level.

8. The mobile terminal according to claim 7, wherein the processor is configured to:

determine a first preset backlight control level as the target backlight control level, when the scene type is a static picture scene;

determine a second preset backlight control level as the target backlight control level, when the scene type is an image preview scene; and determine a third preset backlight control level as the target backlight control level, when the scene type is a dynamic picture scene;

wherein a backlight brightness corresponding to the first preset backlight control level is greater than that corresponding to the second preset backlight control level, and the backlight brightness corresponding to the second preset backlight control level is greater than that corresponding to the third preset backlight control level.

9. The mobile terminal according to claim 7, wherein the processor is configured to:

determine a display frame change level according to a characteristic change between adjacent display frames; and determine the target backlight control level corresponding to the display frame change level according to a preset mapping relationship between display frame change levels and backlight control levels, wherein the target backlight control level increases with an increasing of the display frame change level.

* * * * *